United States Patent

Gschwind

[11] Patent Number: 5,878,657
[45] Date of Patent: Mar. 9, 1999

[54] DEVICE FOR COOKING FOOD

[76] Inventor: Ernst Gschwind, 8511 St. Stefan, Gundersdorf 34, Austria

[21] Appl. No.: 737,121
[22] PCT Filed: May 5, 1995
[86] PCT No.: PCT/AT95/00090
  § 371 Date: Nov. 12, 1996
  § 102(e) Date: Nov. 12, 1996
[87] PCT Pub. No.: WO95/30365
  PCT Pub. Date: Nov. 16, 1995

[30] Foreign Application Priority Data

May 5, 1994 [AT] Austria ................................. A 942/94

[51] Int. Cl.⁶ ............................. A47J 37/00; A47J 37/07; A47J 37/12
[52] U.S. Cl. .................................. 99/446; 99/400; 99/444
[58] Field of Search ............................. 99/339, 340, 375, 99/400, 444–446, 425, 422, 401, 447–450; 126/25 R, 41 R, 39 C, 39 R, 39 D, 275 E Primary Examiner—Timothy F. Simone
Attorney, Agent, or Firm—Henry M. Feiereisen

[57] ABSTRACT

A device for cooking food, in particular a grilling or baking device, includes a system for heating the air, optionally a grate, and hollow sections through which a coolant flows, arranged on two different levels above the air-heating system. The hollow sections on at least one of levels have upper faces in the form of channels which act as drainage channels for the juices from the food being cooked. The hollow sections on the two different levels are horizontally mutually offset and means are provided to prevent the juices from the food being cooked from reaching the glowing grate.

69 Claims, 7 Drawing Sheets

DEVICE FOR COOKING FOOD

BACKGROUND OF THE INVENTION

The invention relates to a device for cooking food, in particular a grilling or baking device of a type having a heating unit for heating the air, preferably a grate, and hollow sections through which a coolant flows and which are arranged on two different levels above the heating unit and are horizontally offset from each other, wherein channels for draining the juices from the food being cooked are formed on the upper faces of the hollow sections on at least one of the levels.

In known devices of this type, for example in grilling devices, heated air flows directly to the lower face of the grate and through its members to the food being cooked. However, juices from the food, especially fat, may drip down. This is especially disadvantageous when the device heating the air includes a glowing nest or glowing rods, since in this case the juices from the food, in particular the fat, will scorch and the residue of combustion carried by the heated air can contaminate the food being cooked.

DE-C-156 208 proposes a grilling device having two rows of grate rods arranged on two different levels above the heating system, such that the dripping fat is collected by the members on the lower grate and channeled to a container for collection.

SUMMARY OF THE INVENTION

It is the object of the invention to overcome these disadvantages and to construct a device of the aforementioned type which would ensure that the grilling process takes place substantially unimpededly and that, in addition, the juices and the fat from the cooked food will not scorch, especially in the area of the glowing nest or the heating zone, as the case may be.

This is accomplished by the inventive device by forming depressions in the hollow sections and sloping the bottom of the depressions downwardly relative to the horizontal direction, while the hollow sections themselves are oriented substantially horizontally.

According to theses advantageous features, the juices dripping from the food are collected and channeled away by parts having a certain shape, for example parts formed as hollow sections through which a coolant flows, to ensure that the juices from the food will neither be able to reach the glowing nest nor become overheated.

In addition, better drainage for the juices can also be provided by inclining the hollow sections with respect to the horizontal direction or by inclining only the bottom of the drainage channels formed in the hollow sections while keeping the hollow sections themselves in a substantially horizontal direction. In the inventive device, the hollow sections arranged in the upper level may also include lengthwise side members pointing downwardly at an angle, with at least the longitudinal edges of the side members being located above the channels in the lower hollow sections and the free edges of the side members having a suitable profile, such as needle-shaped extensions or serrations, formed thereon.

This construction provides drip edges in the region of the upper hollow sections for safely collecting the juices dripping from the food in the region of the lower hollow sections.

In this embodiment, the longitudinal sections of the upper hollow sections in cross-sectional view advantageously form an angle between 10° and 90° with the horizontal direction.

This feature, too, aids in providing distinct drip edges or drip points. In addition, the cooling of the hollow sections can be improved by connecting at least one end of the hollow sections to an air collecting space connected to an intake opening, possibly via a fan, for supplying fresh air.

This feature allows a sufficiently large amount of air for cooling the hollow sections to be circulated through the hollow sections, with the fan being located between the air intake opening and the air collecting space so that it will be exposed to only cold air.

The hollow sections may also be connected to air collecting spaces at both end faces, with the air collecting space connected to the upper ends of the hollow sections including a vent opening.

With this feature, the air heated inside the hollow sections can be properly circulated according to the prevailing ambient factors.

In another embodiment intended to facilitate cleaning of the device, the shape of the hollow sections may be adapted for insertion into conforming recesses in the side panels, especially recesses in the air collecting spaces, where the hollow sections, when completely inserted, are advantageously resting only against at least one side panel and are capable of being easily pulled out from the device for cleaning without requiring the release of special fixtures.

In another embodiment of the invention where the air is heated by a glowing grate adapted to receive a glowing nest, the device may be provided with a slotted plate having a slider for controlling the air supply.

With this feature, the heat from the glow can be controlled in a simple manner.

According to another embodiment of the invention, the temperature of the food being cooked can be further adjusted by placing a slotted plate with a slider above the glowing grate for controlling the supply of hot air to the food.

The space around the hollow sections can also be covered by a lid provided with a closable opening and possibly with a sight window.

This permits controlled venting of the hot air which is generated when cooking with a glowing nest.

In another embodiment of the invention, each hollow section on one level is formed in one piece with the mutually offset section below. This provides for a mechanically simple and robust device.

In another embodiment of the inventive device, the grate for accepting the food to be cooked, for example the food to be grilled, can also be shaped as a completely closed surface having alternating mutually parallel raised portions and depressions formed thereon, with hollow sections through which a coolant flows attached parallel to the depressions on the side opposite to the device heating the air. Such a device also prevents scorching of the juices and the fat dripping from the food while at the same time providing a particularly compact design as required, for example, for table top devices.

According to another feature of the present invention, the cavities of the hollow sections are connected to a water tank wherein the two front ends of the hollow sections are coupled to the water tank. This advantageously provides extensive cooling for the hollow sections receiving the dripping fat.

In a particularly advantageous embodiment of an inventive grilling device, the grate adapted for receiving solid fuel and/or a receptacle located within the grate for receiving the residue of combustion, for example the ashes, is located in a container removable from the device.

As a result of these features, handling of the device, especially the start-up, is rather easy.

BRIEF DESCRIPTION OF THE DRAWING

The invention will now be described in more detail with reference to the drawings. In the drawings is shown in.

Although the invention is described based on a grilling device, the invention is not limited to this specific embodiment. Food may be cooked and prepared not only on a grill grate, but also on a plate, on a stone or the like heated by the heat source of the device.

Figure 1:
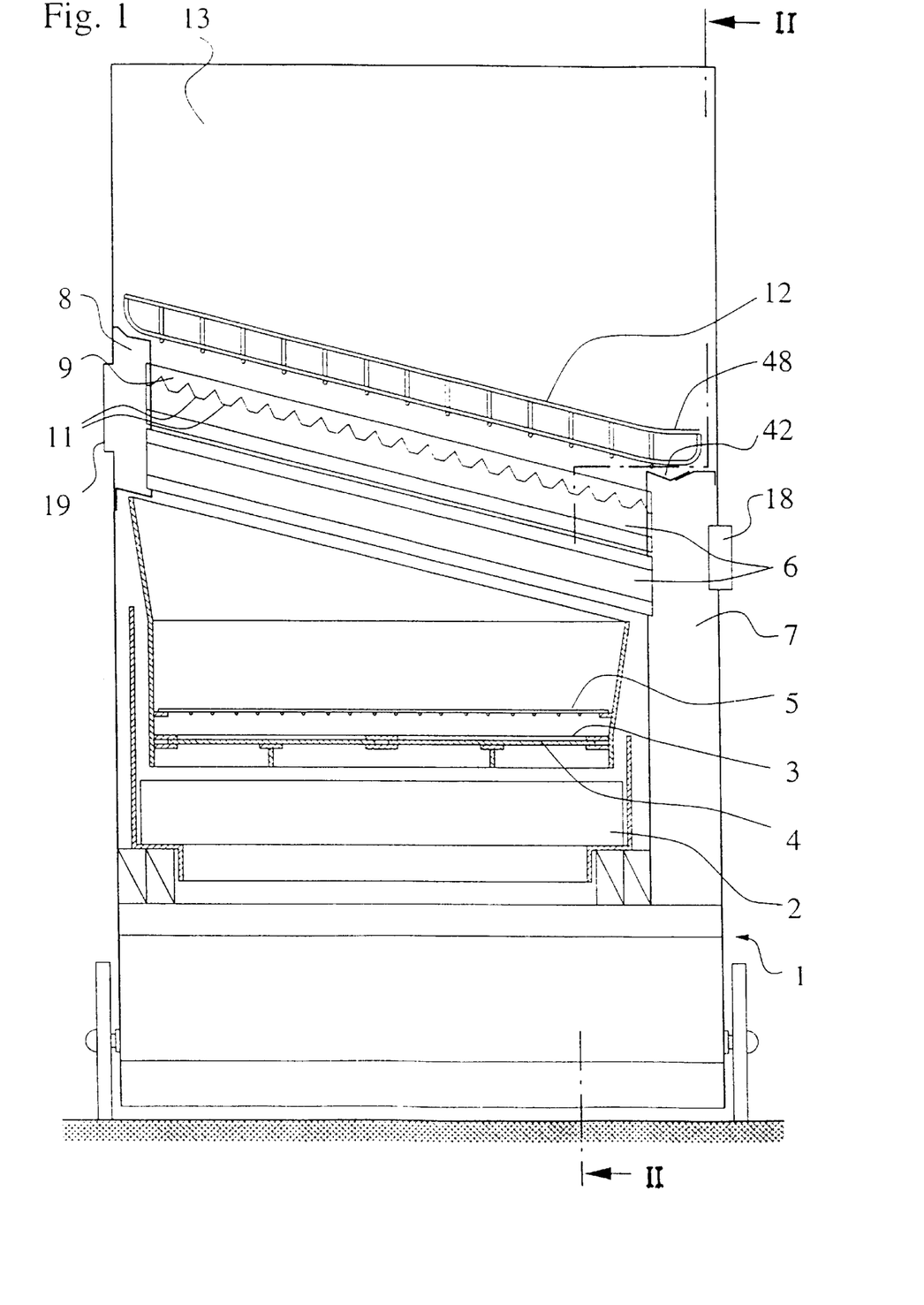
FIG. 1 a cross-sectional view of the first embodiment of the inventive device.
Figure 2:
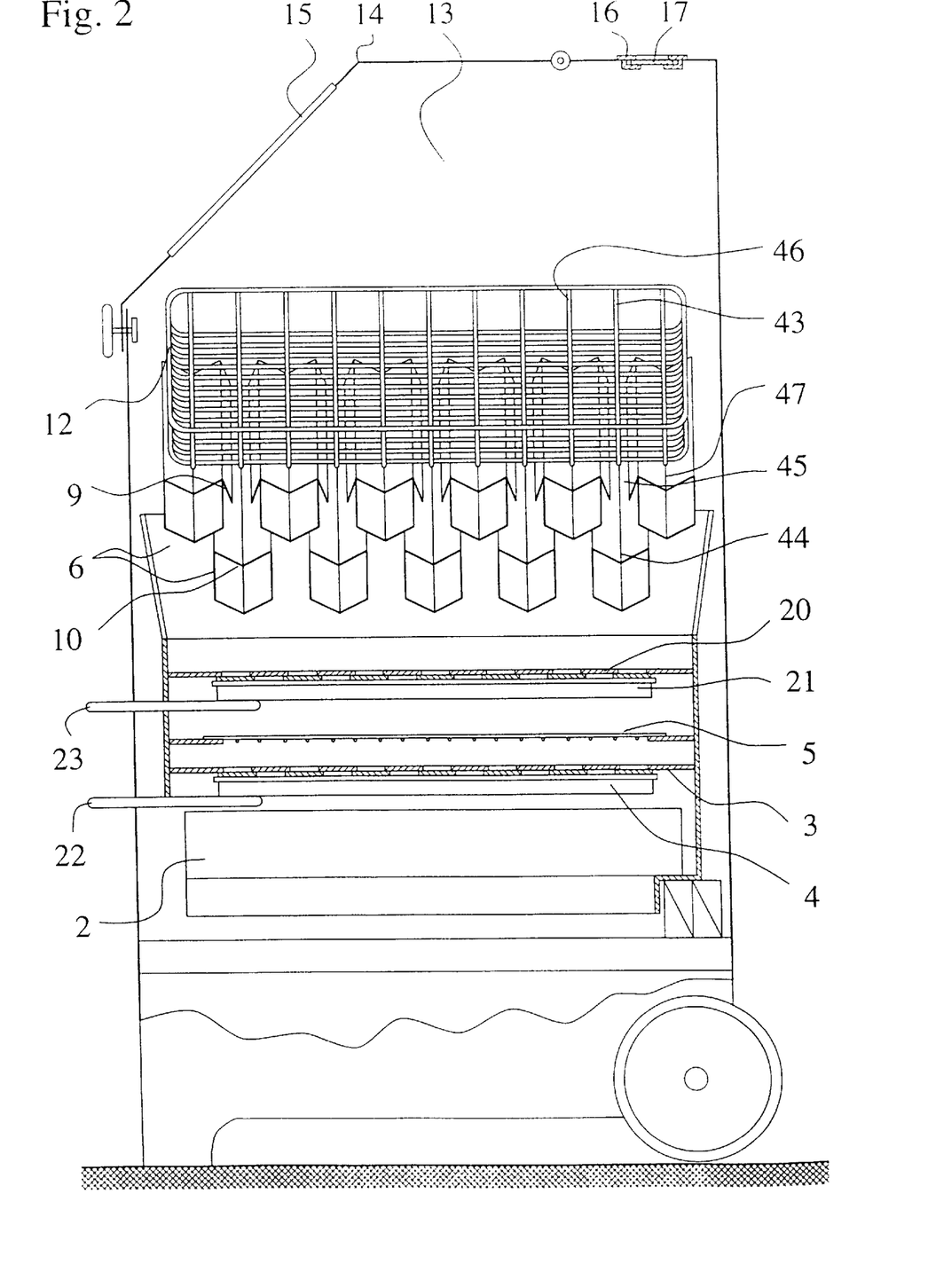
FIG. 2 a sectional view along the line II—II of FIG. 1.

In the embodiment of FIGS. 1 and 2, there is located in the lower portion of the housing 1 an ash drawer 2 and above it a slotted plate 3 with slots which can be closed more or less with a slotted slider 4 actuated via a handle 22.

Located above the slotted plate 3 is a glowing grate 5 adapted for receiving the glowing nest for heating the air and the respective fuel.

Located above the glowing grate 5 is another slotted plate 20 with the slots which are more or less adjustable via a slider 21. The adjustment is effected from the outside via a handle 23.

With this feature the supply of hot air to the food being cooked can be easily controlled, especially reduced.

Located on two levels above the slotted plate 20 and inclined with respect to the horizontal direction are hollow sections 6 having open ends which terminate in air collecting spaces 7 and 8. In a different embodiment, the bottom of the channel formed in the hollow sections 6 is inclined with respect to the horizontal direction while the hollow sections themselves remain horizontal, as shown in detail in FIG. 7.

Here, the air collecting space 7 is connected to an air intake opening having preferable a fan 18 disposed therein for circulating air through the hollow sections 6.

The upper air collecting space 8 is connected to a vent opening 19.

The air collecting space or spaces—in conjunction with the hollow sections—form an independent system separate from the hot air circulating in the device, thereby advantageously and inventively cooling the juices from the food being cooked.

The invention is not limited to the embodiment described above where air, possibly forced air, is employed as cooling medium. The use of water as cooling medium is also within the scope of the invention. This can be implemented by supplying water to the air collecting space and to let the water drain through the hollow sections extending beyond the space 7. Also within the scope of the invention lies an embodiment wherein each of the ends of the hollow sections are combined to form a supply and a drain line, respectively, which may be connected to a pump or a chiller to form a recirculating closed loop.

As shown in FIG. 2, the hollow sections 6 on the upper level may have an arrow-shaped cross-section and may be provided with inclined side members 9 pointing downwardly and having profiled longitudinal edges, as shown in FIG. 1, thereby forming a plurality of drip points 11. The side members 9 may be inclined with respect to the horizontal direction by between 10 and 90 degrees. Any other suitable profile other than serrations may be chosen, such as needle-shaped protruding rods or extensions, in order to prevent continuous draining along the edge.

The hollow sections 6 on the two different levels are mutually offset and are provided on their upper surfaces with a channel 10 formed by an inward pointing bend for receiving and draining the juices from the grilled food.

FIG. 2 also shows that the clearances between the hollow sections 6 on the upper level are smaller than the widths of the hollow sections 6 on the lower level, so that the outer edges of the side members 9 of the upper hollow sections 6 are positioned vertically above the channels 10 of the hollow sections 6 on the lower level, such that the juices from the grilled food dripping between the hollow sections 6 on the upper level are securely received by the channels 10 in the lower hollow sections.

Located above the hollow sections 6 is a grate 12 having cross members 43, 46 for receiving the food to be grilled, said grate arranged in such a way that the members 43 extending parallel to the longitudinal direction of the hollow sections are positioned more or less above the channel bottom 44 in the hollow sections 6 on the lower level, but certainly above the space 45 between the two side members 9 of two adjacent hollow sections, and that the other members 46 extending parallel to the longitudinal direction of the hollow sections are positioned more or less above the channel bottom 47 in the hollow sections 6 on the upper level. This arrangement ensures that the juices from the grilled food drip cleanly toward the hollow sections.

The lower end of the grate 12 terminates in a horizontal section 48 located above a receiving channel 42. The receiving channel 42 is provided with openings (not shown), so that any juices from the grilled food draining along the grate rods and collected by the groove 42 can drip through these openings into the collection container 41 for collecting the juices. This is the same collection container 41 which also receives juices from the channels in the hollow sections.

The grilled food is covered with a lid 13 having a hinged cover 14 which is provided with a sight window 15.

In addition, the lid 13 has an opening with a slotted plate 16 and a slider 17 for venting vapors.

During the grilling process, the air heated by the glowing nest located on the glowing grate rises between the hollow sections 6 to the food to be grilled located on grate 12, cooks the food and is vented through the opening controlled by the slotted plate 16 and the slider 17.

The juices dripping from the grilled food are received and carried away by the channels 10 in the hollow sections 6 which are cooled by a cooling medium, such as air, flowing through the cavities of the hollow sections.

Figure 3:
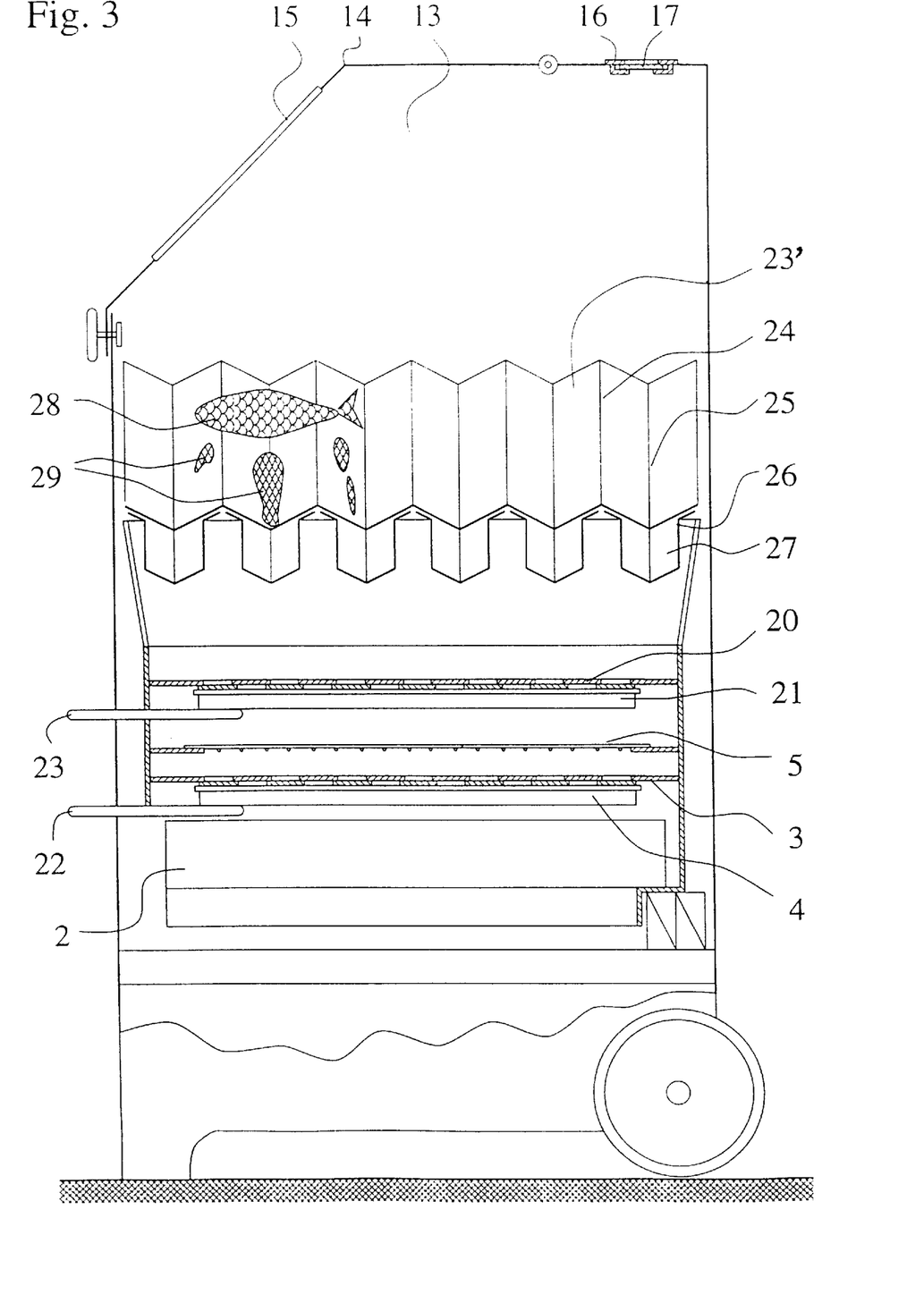
FIG. 3 another embodiment of the inventive device in a cross-sectional view similar to FIG. 2.

FIG. 3 shows a grilling device which is identical to the device shown in FIGS. 1 and 2, except for the grill grate and the configuration of the hollow sections. In this embodiment, the grill grate is formed as a plate 23' with a continuous solid surface in which alternating mutually parallel raised portions 24 and depressions 25 are formed. The raised portions 24 represent the contact surface for the food to be grilled 28, whereas the depressions 24 form the drainage channels for the juices and the fat 29 generated during the grilling process. Here, too, hollow sections 26 are attached lengthwise along the groove-shaped depressions 25 on the side opposite to the glowing grate 5 for preventing scorching and overheating of the juices. In this way, channels 27 are formed for carrying a cooling medium, for example for an air flow generated by fan 18. Consequently, the juices and the fat from the grilled food can drain unimpededly.

Figure 4:
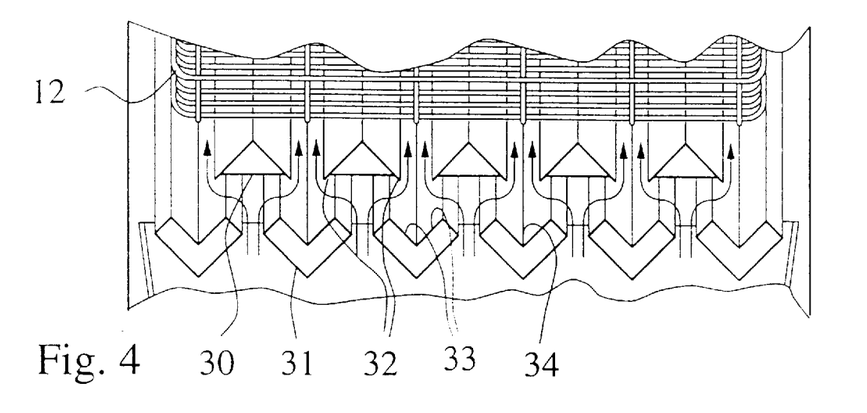
FIGS. 4, 5, 6 and 7 additional possible embodiments of the hollow sections.

FIG. 4 shows a different implementation of the hollow sections, with the hollow sections on the level opposite to the grill grate 12 having a substantially triangular cross-section and the hollow sections 31 on the level below having a substantially L-shaped cross-section. In the present design, the sections 30 are positioned above the sections 31 in such a way that the edges 32 are located above the channels formed by the surfaces 33 in the L-shaped sections 31, so that the juices from the grilled food are again gathered over the entire area and collected and carried away by the channels 34.

Figure 5:
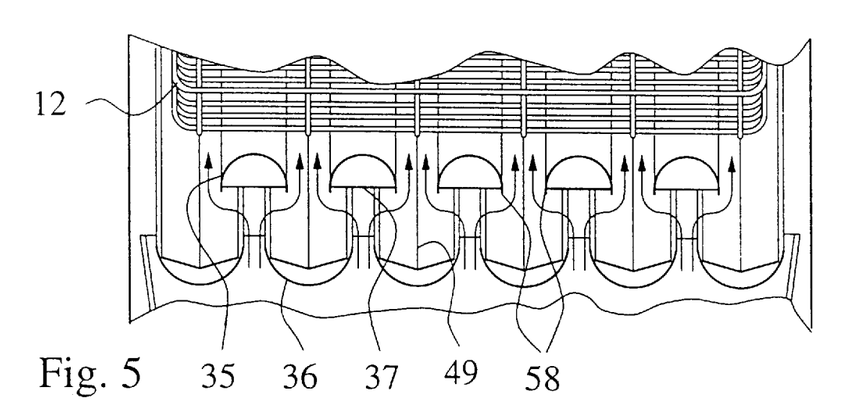

The hollow sections of FIG. 5 are different from those of FIG. 4 only with respect to the cross-sectional shape of sections 35, 36 which, in the present example, are substantially semicircular, with the section 35 being terminated by a fin 37 extending lengthwise along a chord, thereby providing drip edges 58 similar in shape to the profile of the drip edges in FIG. 4; the juices from the grilled food are collected and carried away in channels 49.

Figure 6:
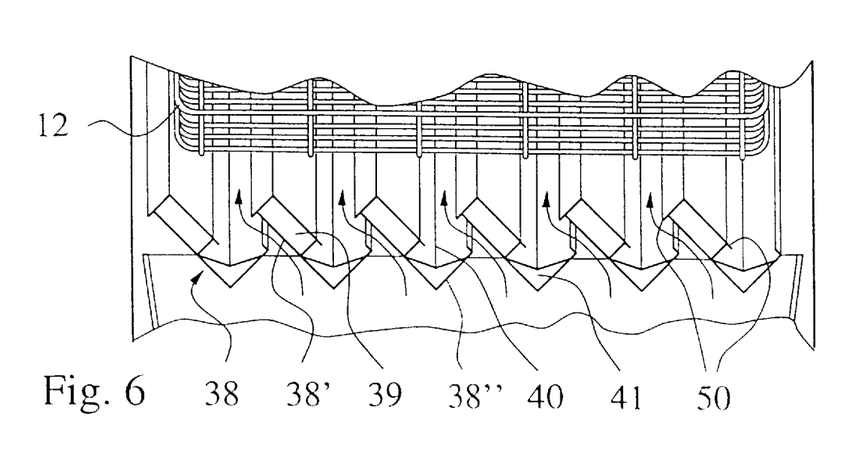

FIG. 6 shows still another embodiment of the hollow sections. According to this embodiment, only one hollow section is provided which is, however, formed as a double-height channel 38 with a protruding edge 50. In the section 38' opposite to the grill grate 12, there is formed a first channel which includes the flow channel 39 and which primarily receives the juices and the fat from the grilled food and carries those juices simultaneously to the channel 40 located in the second hollow channel 38" and, because of the staggered arrangement of the adjacent sections, also to the channel 40 of the adjacent double-height channel section. Both channels 39 and 40 can have a cooling medium circulating through them.

Figure 7:
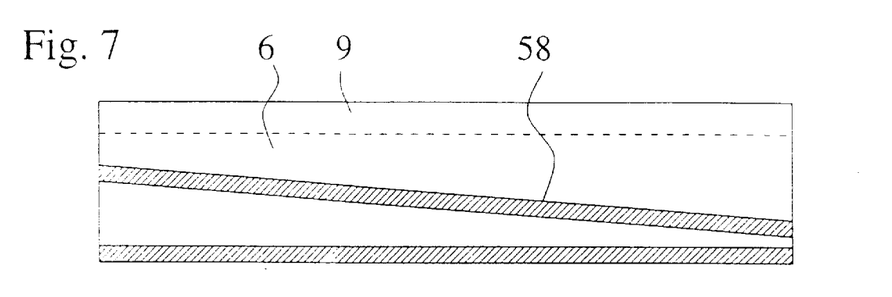

FIG. 7 shows a horizontal arrangement of the hollow sections 6 enabling the juices to drain from the grilled food since the bottom 58 of the channels 10 formed in the hollow sections 6 is inclined with respect to the horizontal direction.

Figure 8:
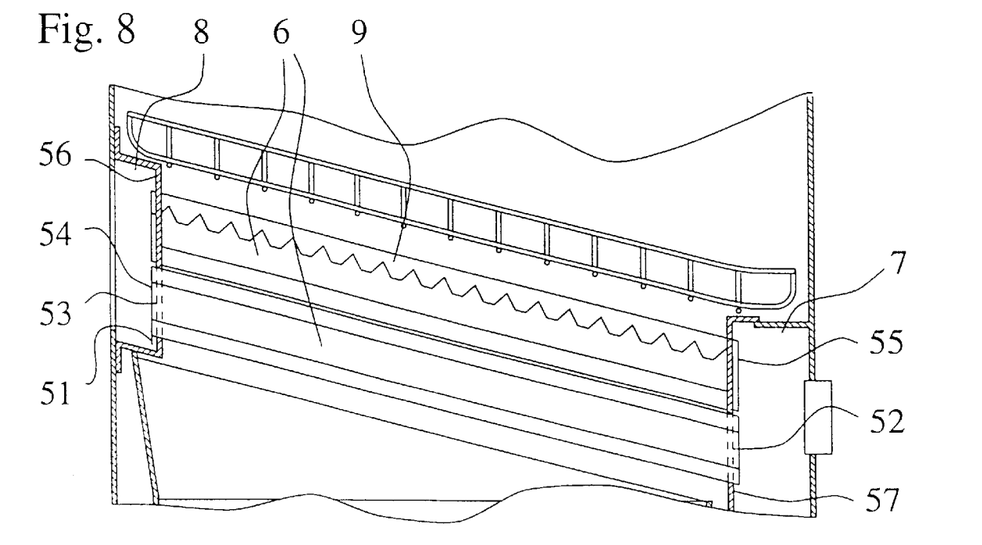
FIG. 8 a detailed view of the arrangement of the hollow sections of FIG. 1.

FIG. 8 shows an arrangement of the hollow sections for facilitating removal of the grilling device for cleaning. Cut-outs 53 provided in the side panel 56 of the air collecting space 8; the ends of the hollow sections 6 having the same cross-section as the cut-outs 53 are pushed into these cut-outs, until the other ends of the hollow sections 6 fit through the cut-outs 52 in the side panel 57 of the air collecting space 7. The upper row of the hollow sections 6 is held in position because the cross-section of the cut-outs 52 corresponds to only a portion of the entire cross-section of the hollow sections 6, i.e. to the cross-section without the longitudinal sections 9, and the longitudinal sections 9 are recessed in relation to the lower end face 55 of the hollow sections, such that the extent to which the hollow sections 6 can extend into the lower air collecting space 7 is limited by the recessed length of the longitudinal sections 9, namely until the longitudinal sections 9 are touching the side panel 57, thereby supporting the hollow sections 6. Position support for the lower row of the hollow sections 6 is provided by a protrusion 51 which is located on the end face 54 of the upper hollow section and does not mate with a matching cut-out in the side panel 56 of the air collecting space 8, such that this protrusion is supported by the outside of side panel 56 when the hollow section is inserted.

Figure 9:
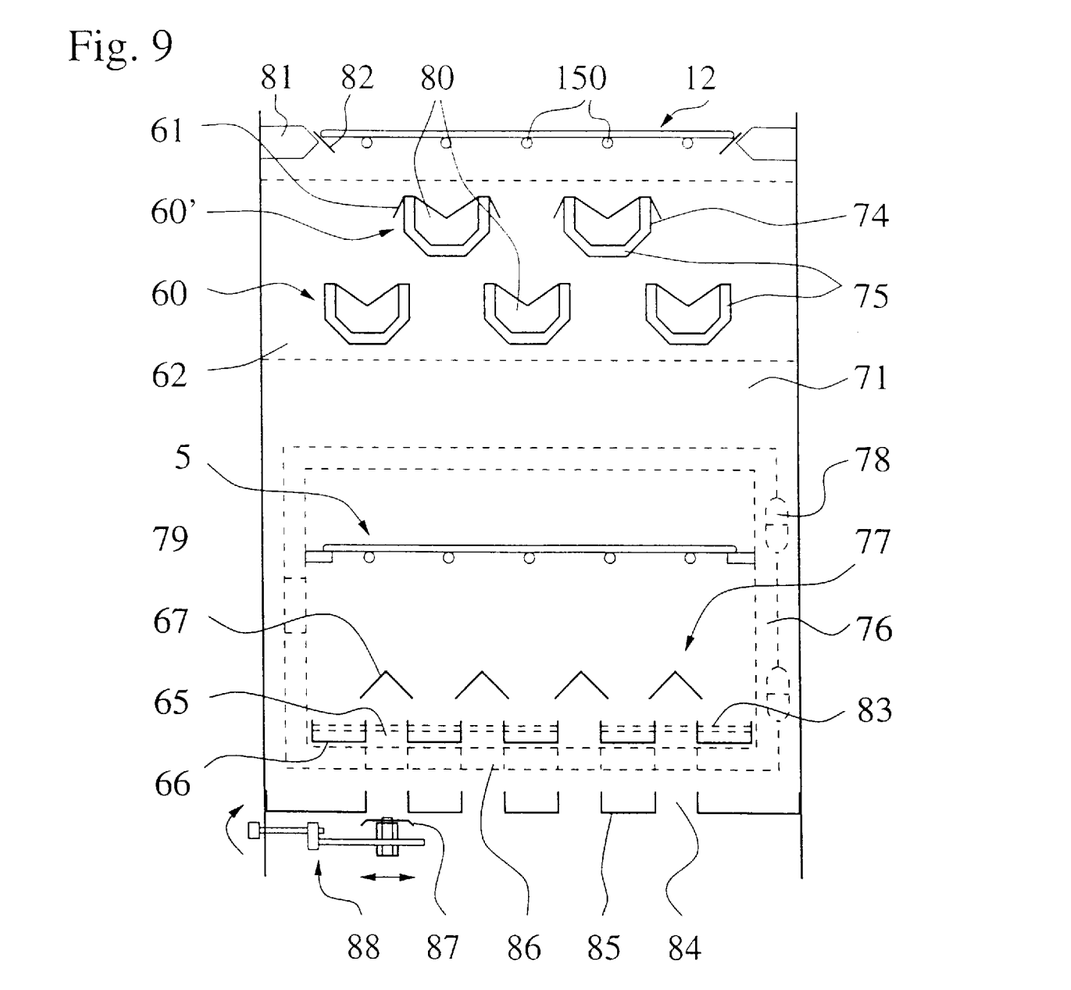
FIG. 9 a schematic cross-sectional view of a second embodiment of a device according to the invention.

In the embodiment of FIG. 9, hollow sections 60, 60' having cavities 80 connected to a water tank 62 and preferably having water circulating therein by thermosiphon action, are located below the grill grate 12. Air may also be used for circulation. The number 74 refers to additional metal baffles for thermal insulation. The cavity enclosed by these shields can also have water circulating therethrough. Thermal insulation for the cavities of the hollow sections receiving the juices from the grilled food can also be provided by filling the cavities 75 and/or 80 with a thermally insulating material, for example with stone wool, glass wool, fire-clay, or the like. It is also feasible to construct the hollow sections 60, 60' from fireproof glass or from another fireproof material with poor thermal conductivity; the hollow sections may also be evacuated.

Figure 11:
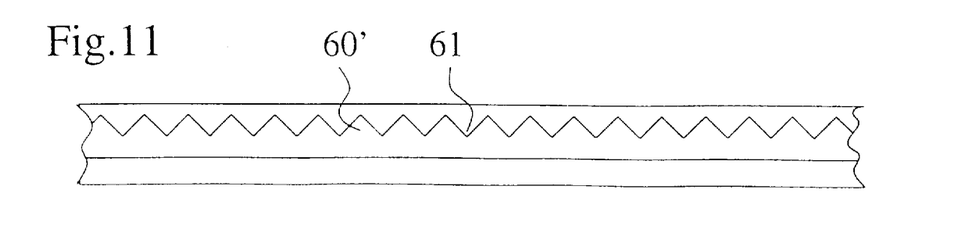

The hollow sections 60' are provided with side members 61 which are, as FIG. 11 shows, serrated in order to make it easier for the fat to drip down.

The grill grate itself is designed and constructed in such a way that its cross members 150 are located above the lowest points of the bottom of the hollow sections 60, 60'. The lateral connecting pieces 81 for supporting the grill grate 12 are formed with baffle plates 82 for preventing the juices dripping from the grilled food from missing the sections 60, 60' and reaching the glowing grate 5.

In addition, FIG. 9 shows that the grate 5 adapted for holding solid fuel as well as a receptacle for receiving residues of combustion and an air supply device—labeled 77 as a unit—are arranged together in a container 76 which can be rotated out of the device through an opening 89 located in the its wall 71 by means of hinges 78. Although not shown separately, the container 76 may also be pulled out of the device like a drawer and/or tilted out, i.e. be at least partially removable from the device.

Alternately, the grate 5 and the receptacle 77 may also be located in their own container removably attached to the device. It is an important feature of the inventive device that the grate 5 and the receptacle 77 can be removed from the device for ease of operation and use.

Aiding the operation of the device is an opening 79 in the side wall of container 76 for controlling the cross-section of the air flow. This opening permits the ignition of fuel, for example of charcoal, directly below the glowing grate without chemical starters such as white coal.

Figure 10:
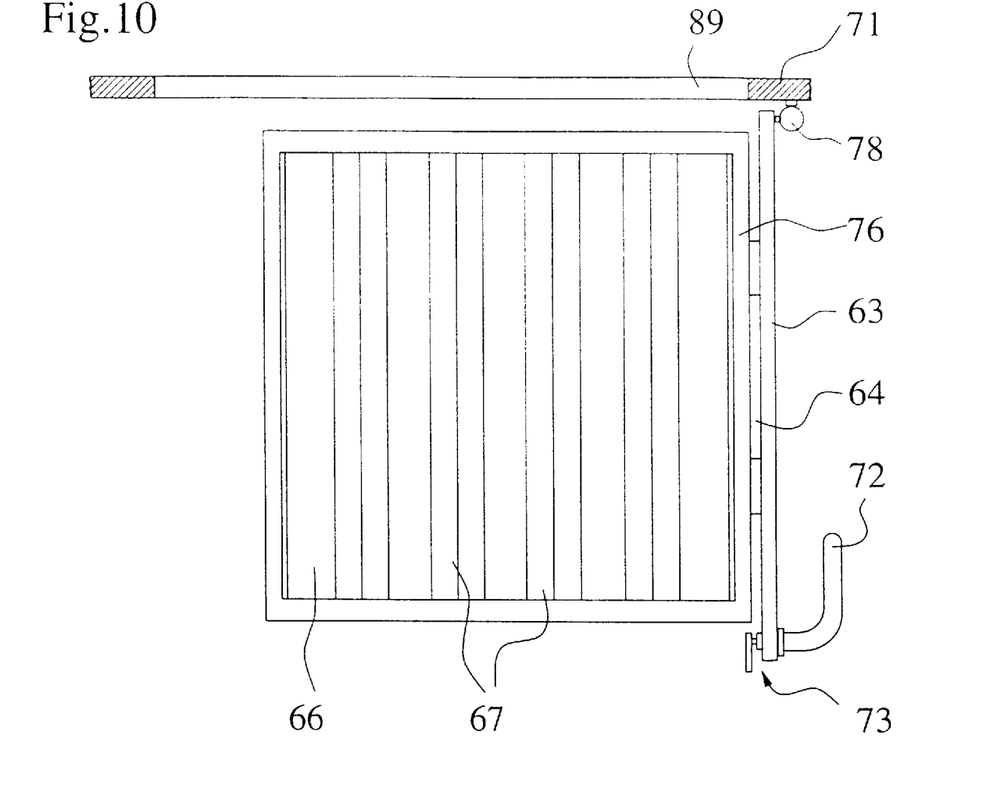
FIGS. 10 and 11 schematic details of the embodiment of FIG. 9.

In FIG. 10, the container 76 is secured to a door 63, with a gap 64 provided between the door 63 and at least the receptacle 77 to prevent that the door 63 becomes unacceptably hot.

On the receptacle 77, there are arranged regularly spaced substantially U-shaped channels 66 having gaps 65 in between for allowing air to flow upwardly.

In addition, the spacer gaps 65 are covered by roof-shaped sections 67 having longitudinal edges which, in top plan view, slightly overlap the U-shaped channels 66. However, the roof-shaped sections 67 are vertically spaced apart from the U-shaped channels 66, allowing the air to flow upwardly across a large area through the remaining gaps between the upper edges of the sides of channels 66 and the lower edges of the sections 67. Air is supplied from the outside via the openings 84 in the bottom 85 and openings 86 in the bottom of receptacle 76. The air supply can be controlled via one or more flaps 87 which can be adjusted via a screw spindle arrangement 88.

The ash and other residues of combustion are collected in the U-shaped channels 66. Several channels 66 may be connected on the front side—as indicated for 83—and be removable from the container 76 as a unit, thereby facilitating removal of the ash.

The door 63 can be locked with the frame 71 via a closure 73 provided with a handle 72.

The aforedescribed embodiment is particularly advantageous in that, on one hand, juices from the grilled food do not reach the glowing grate and that, on the other hand, ashes or residues of combustion do not reach the floor on which the device rests, while providing at the same time continuous ventilation, i.e. a supply of outside fresh air, across a large area. In addition, the glowing grate and/or the ash receptacle can be removed from the device.

What is claimed is:

1. A device for cooking food, in particular a grilling or baking device, comprising:

heating means for supplying heated air to the food to be cooked;

a plurality of elongated hollow sections arranged above the air-heating means on two vertically spaced apart upper and lower levels and adapted to receive a coolant flow, wherein each hollow section has an upper face and two end faces and wherein the hollow sections on the upper level are horizontally mutually offset from the hollow sections on the lower level;

each hollow section on at least one of the upper and lower levels further comprising a longitudinally extending drainage channel which is formed on the upper face of the hollow section and has a channel bottom, for draining the juices from the food being cooked, wherein in the longitudinal direction the channel bottom is inclined relative to the horizontal when the hollow section in which the channel is formed, is oriented substantially horizontally.

2. The device according to claim 1, wherein the hollow sections on at least one level are inclined with respect to the horizontal direction.

3. The device according to claim 1, further comprising at least one air collection space, wherein at least one of the two end faces of each hollow section is connected to a respective air collection space.

4. The device according to claim 3, further comprising a fan connected to one of said air collection spaces for supplying fresh air to the air collection space.

5. The device according to claim 3, the air collection spaces further comprising side panels having cut-outs adapted to receive the hollow sections.

6. The device according to claim 5, wherein the hollow sections when completely inserted in the cut-outs, are supported by at least one of the side panels.

7. The device according to claim 5, wherein each end face of the hollow sections is connected to a respective air collection space and wherein one of the air collection spaces forms a vent opening.

8. The device according to claim 1, wherein the heating means comprise a glowing grate adapted to receive a glowing nest, the device further comprising one or more slotted plates disposed vertically spaced apart from the glowing grate and comprising a slider for regulating the supply of heated air to the food to be cooked.

9. The device according to claim 1, further comprising a lid covering a space above the hollow sections, wherein the lid comprises an opening and a slider capable of at least partially covering the opening for adjusting the size of the opening.

10. The device according to claim 9, the lid further comprising a sight window.

11. The device according to claim 1, wherein one of the hollow sections of one vertically spaced apart level is combined with a respective one horizontally offset hollow section of the other vertically spaced apart level to form a single unit.

12. The device according to claim 1, further comprising a cooking grate comprising a plurality of rods onto which the food is placed, wherein the rods are parallel to and in alignment with the bottom of the channels of the hollow sections located on at least one of the vertically spaced apart levels.

13. The device according to claim 1, wherein the end faces of the hollow sections are connected to a water supply.

14. The device according to claim 1, wherein each of the hollow sections is enclosed by a baffle, with the space between the baffle and the respective hollow section defining an insulating cavity.

15. The device according to claim 14, wherein the insulating cavities are filled with a heat insulating material.

16. The device according to claim 14, wherein the hollow sections are filled with a heat insulating material.

17. The device according to claim 1, wherein the hollow sections are made of a material selected from the group consisting of a fireproof heat insulating material and a fireproof material with poor thermal conductivity.

18. The device according to claim 17, wherein the fireproof heat insulating material is glass.

19. The device according to claim 1, wherein the hollow sections are evacuated.

20. The device according to claim 1, wherein the heating means comprise a fuel grate adapted to receive solid fuel, the device further comprising a receptacle for receiving combustion residues and a removable container, wherein at least one of the fuel grate and the receptacle are located in the removable container.

21. The device according to claim 20, wherein an at least partially closeable opening is disposed on a side wall of the removable container.

22. The device according to claim 20, further comprising: a plurality of mutually parallel spaced apart channels disposed below the fuel grate for receiving the combustion residues; and a plurality of roof-shaped profiles disposed between said channels, wherein the roof-shaped profiles cover the spaces between said channels and laterally overlap the channels.

23. The device according to claim 22, further comprising first slots formed in a bottom of the device underneath the roof-shaped profiles for supplying fresh air, second slots formed on a bottom of the removable container, wherein the first slots aligned with the second slots.

24. The device according to claim 22, wherein the channels for receiving the combustion residues can be removed from the removable container.

25. The device according to claim 22, wherein the fuel grate and the channels for receiving the combustion residues are arranged inside the removable container and—in combination with the removable container—form an assembly.

26. The device according to claim 22, further comprising a door pivotally attached to a wall of the device, wherein the removable container is secured to the door without directly contacting the door.

27. A device for cooking food, in particular a grilling or baking device, comprising:

heating means for supplying heated air to the food to be cooked;

a plurality of elongated hollow sections arranged above the air-heating means on two vertically spaced apart upper and lower levels and adapted to receive a coolant flow, wherein each hollow section has an upper face and two end faces and wherein the hollow sections on the upper level are horizontally mutually offset from the hollow sections on the lower level;

each hollow section on at least the lower level further comprising a longitudinally extending drainage channel which is formed on the upper face of the hollow section, for draining the juices from the food being cooked, each hollow section on the upper level further comprising a plurality of elongated side members having free lateral edges and laterally secured to the hollow sections on the upper level, wherein the free lateral edges of the side members are positioned vertically above the drainage channels of the hollow sections on the lower level.

28. The device according to claim 27, wherein the hollow sections on at least one level are inclined with respect to the horizontal direction.

29. The device according to claim 27, wherein the free lateral edge of at least one of the side members comprises a profile.

30. The device according to claim 29, wherein the profile comprises an element taken from the group consisting of serration, protrusion or needle-shaped extension.

31. The device according to claim 27, wherein in the transverse direction, the side members form an angle with the horizontal direction between 10° and 90°.

32. The device according to claim 27, wherein in the transverse direction, the side members form an angle with the horizontal direction between 10° and 30°.

33. The device according to claim 27, further comprising at least one air collection space, wherein at least one of the two end faces of each hollow section is connected to a respective air collection space.

34. The device according to claim 33, further comprising a fan connected to one of said air collection spaces for supplying fresh air to the air collection space.

35. The device according to claim 33, the air collection spaces further comprising side panels having cut-outs adapted to receive the hollow sections.

36. The device according to claim 35, wherein the hollow sections when completely inserted in the cut-outs, are supported by at least one of the side panels.

37. The device according to claim 33, wherein each end face of the hollow sections is connected to an air collection space and wherein one of the air collection spaces forms a vent opening.

38. The device according to claim 27, wherein the heating means comprise a glowing grate adapted to receive a glowing nest, the device further comprising one or more slotted plates disposed vertically spaced apart from the glowing grate and comprising a slider for regulating the supply of heated air to the food to be cooked.

39. The device according to claim 27, further comprising a lid covering a space above the hollow sections, wherein the lid comprises an opening and a slider capable of at least partially covering the opening for adjusting the size of the opening.

40. The device according to claim 39, the lid further comprising a sight window.

41. The device according to claim 27, wherein one of the hollow sections of one vertically spaced apart level is combined with a respective one horizontally offset hollow section of the other vertically spaced apart level to form a single unit.

42. The device according to claim 27, further comprising a cooking grate comprising a plurality of rods onto which the food is placed, wherein the rods are parallel to and in alignment with the bottom of the channels of the hollow sections located on at least one of the vertically spaced apart levels.

43. The device according to claim 27, wherein the end faces of the hollow sections are connected to a water supply.

44. The device according to claim 27, wherein each of the hollow sections is enclosed by a baffle, with the space between the baffle and the respective hollow section defining an insulating cavity.

45. The device according to claim 44, wherein the insulating cavities are filled with a heat insulating material.

46. The device according to claim 44, wherein the hollow sections are filled with a heat insulating material.

47. The device according to claim 27, wherein the hollow sections are made of a material selected from the group consisting of a fireproof heat insulating material and a fireproof material with poor thermal conductivity.

48. The device according to claim 47, wherein the fireproof heat insulating material is glass.

49. The device according to claim 27, wherein the hollow sections are evacuated.

50. The device according to claim 27, wherein the heating means comprise a fuel grate adapted to receive solid fuel, the device further comprising a receptacle for receiving combustion residues and a removable container, wherein at least one of the fuel grate and the receptacle are located in the removable container.

51. The device according to claim 50, wherein an at least partially closeable opening is disposed on a side wall of the removable container.

52. The device according to claim 50, further comprising a plurality of mutually parallel spaced apart channels disposed below the fuel grate for receiving the combustion residues; and a plurality of roof-shaped profiles disposed between said channels, wherein the roof-shaped profiles cover the spaces between said channels and laterally overlap the channels.

53. The device according to claim 52, further comprising first slots formed in a bottom of the device underneath the roof-shaped profiles for supplying fresh air, second slots formed on a bottom of the removable container, wherein the first slots aligned with the second slots.

54. The device according to claim 52, wherein the channels for receiving the combustion residues can be removed from the removable container.

55. The device according to claim 52, wherein the fuel grate and the channels for receiving the combustion residues are arranged inside the removable container and—in combination with the removable container—form an assembly.

56. The device according to claim 52, further comprising a door pivotally attached to a wall of the device, wherein the removable container is secured to the door without directly contacting the door.

57. A device for cooking food, in particular a grilling or baking device, comprising:

heating means for supplying heated air to the food to be cooked;

a grate on which the food to be cooked is placed, the grate formed as a continuous solid surface with alternating mutually parallel raised and depressed portions; and a plurality of hollow sections having end faces and formed as cavities, wherein the cavities are adapted to receive a coolant flow and the hollow sections are attached parallel to the depressed portions on the side of the continuous solid surface which faces the air heating means.

58. The device according to claim 57, wherein the end faces of the hollow sections are connected to a water supply.

59. The device according to claim 57, wherein the cavities are filled with a heat insulating material.

60. The device according to claim 57, wherein the hollow sections are made of a material selected from the group consisting of a fireproof heat insulating material and a fireproof material with poor thermal conductivity.

61. The device according to claim 60, wherein the fireproof heat insulating material is glass.

62. The device according to claim 57, wherein the hollow sections are evacuated.

63. The device according to claim 57, wherein the heating means comprise a fuel grate adapted to receive solid fuel, the device further comprising a receptacle for receiving combustion residues and a removable container, wherein at least one of the fuel grate and the receptacle are located in the removable container.

64. The device according to claim 63, wherein an at least partially closeable opening is disposed on a side wall of the removable container.

65. The device according to claim 63, further comprising a plurality of mutually parallel spaced apart channels disposed below the fuel grate for receiving the combustion residues; and a plurality of roof-shaped profiles disposed between said channels, wherein the roof-shaped profiles cover the spaces between said channels and laterally overlap the channels.

66. The device according to claim 65, further comprising first slots formed in a bottom of the device underneath the roof-shaped profiles for supplying fresh air, second slots formed on a bottom of the removable container, wherein the first slots aligned with the second slots.

67. The device according to claim 65, wherein the channels for receiving the combustion residues can be removed from the removable container.

68. The device according to claim 65, wherein the fuel grate and the channels for receiving the combustion residues are arranged inside the removable container and—in conjunction with the removable container—form an assembly.

69. The device according to claim 65, further comprising a door pivotally attached to a wall of the device, wherein the removable container is secured to the door without directly contacting the door.

* * * * *